June 22, 1965  W. C. KIRKPATRICK  3,190,050
PLASTIC MULTIPLE PACK CARRIER
Original Filed Dec. 27, 1960

INVENTOR
WYLIE C. KIRKPATRICK

BY Charles E. Parker

ATTORNEYS

3,190,050
PLASTIC MULTIPLE PACK CARRIER

Wylie C. Kirkpatrick, Wayland, Mass., assignor to W. R. Grace & Co., Cambridge, Mass., a corporation of Connecticut
Original application Dec. 27, 1960, Ser. No. 78,486, now Patent No. 3,087,610, dated Apr. 30, 1963. Divided and this application Dec. 31, 1962, Ser. No. 264,463
1 Claim. (Cl. 53—30)

This application is a division of my prior copending application, Serial No. 78,486, now U.S. Patent Number 3,087,610.

This invention relates to a multi-pack container carrier designed to hold a plurality of packaged commodities and particularly to a carrier which holds the packages in a rigid, tightly bound pack. Although it is primarily adapted as a carrier for beer and soft drink cans—where it appears to have special utility, it will be obvious that it may be used with comparatively rigid packages containing any material and, in fact, may be used to form any of the multiple pack items now found on the shelves of stores.

A beer and soft-drink carrier will be used as the preferred example.

Multi-pack carriers have become extremely popular and usually consist of modifications of carton-board box structures provided with a central handle. However, these carriers require a substantial amount of carton-board, their die-cut shape produces considerable waste and they are, accordingly relatively expensive. Furthermore, unless the carton-board is specially treated, they are not water-proof and will disintegrate if the multi-pack becomes wet.

It is an object of this invention to make an entirely water-proof multi-carrier; to use a small amount of inexpensive material; to make a carrier which is very low in cost; to make a carrier which may be shipped to the brewery—or bottling plant—in flat, space saving packs; to avoid the cost of printing a carrier but, nevertheless, retain label display advantage; and to make a carrier which can be applied to the cans in a simple and expeditious manner.

My invention makes use of the heat-shrinking properties of stretched (oriented) plastic films. Various types of heat-shrinkable, plastic films are suitable. Among such may be mentioned stretched films of rubber hydrochloride, stretched films of vinylidene chloride and films of analogous materials which have the necessary mechanical characteristics. But, because of its low cost and of its high tensile strength and very high shrink energy, I prefer to use irradiated polyethylene which, subsequent to irradiation, has been stretched in both directions at least 350%. Irradiated, biaxially oriented polyethylene has high shrink energy, i.e. from 100 to 500 p.s.i. at 96° C. Shrink energy is the force of contraction at a given temperature when the material is restrained and, more specifically, it is the measurable tension in a fully mono-directionally restrained strip of film when the film is heated to the specified temperature.

Thus, when a loose jacket surrounding the cans is heated it will shrink tightly about the cans and will exert a very considerable compressional force which holds all cans in contact at their end seams and makes a rigid, rattle-free pack.

The invention will become apparent from the specification and from the drawings in which.

Figure 1:
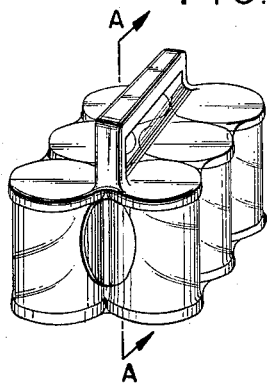
FIGURE 1 represents an elevation of the completed multi-pack showing the cans in place.
Figure 2:
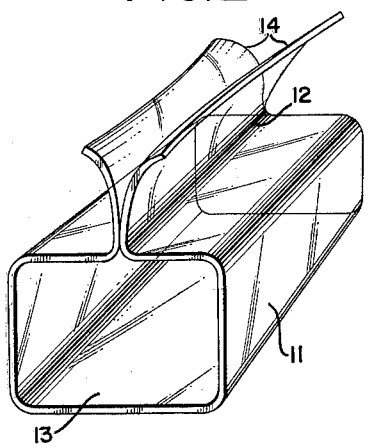
FIGURE 2 shows the folded and transversely heat-sealed band which surrounds the cans.
Figure 3:
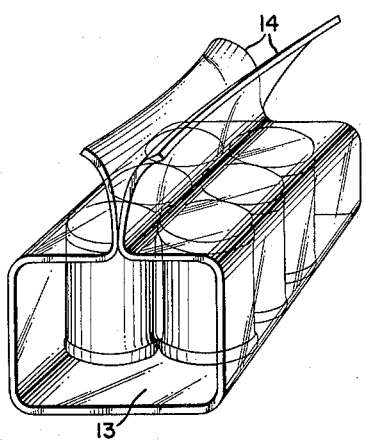
FIGURE 3 shows the group of cans placed inside a loosely fitting plastic band.
Figure 4:
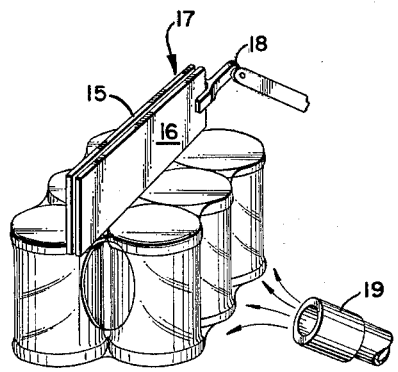
FIGURE 4 represents the method by which the plastic is shrunk about the cans.
Figure 5:
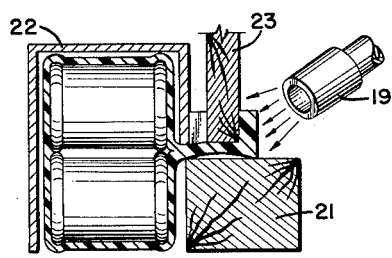
FIGURE 5 illustrates the method of forming the handle of the can carrier.

Referring to FIGURE 2, the manufacture of the carrier begins by folding an elongated strip of plastic material back on itself (for a pack of six beer cans, the strip is about 28 to 30 inches long and about 8 inches wide—the film may be from 1¼ to 2 mils thick). The opposing sides of the strip 11 are then heat-sealed or welded together using, for example, a bar type heat-sealer to form the seam 12. The loop portion 13 is large enough to surround erect cans loosely while the free tail portions 14 and 14 may be, in the case of beer cans, 5 or 6 inches in length. The group of upright cans is then pushed in to the loop 13 which loosely surrounds them. The seam 12 is placed along the median line of the group of cans and the tails 14 are left projecting upwardly, as shown in FIGURE 3. The tails 14—14 are then pinched between the leaves 15 and 16 of a heat shield 17. Shield 17 may be merely two sheets of plywood moved into and away from clamping position by a toggle 18. A blast of hot air from the "heat-gun" 19 is then directed over the entire exposed surface of the film which then shrinks and holds the cans together into a tight package. The pack is then laid on its side and the tails 14—14 are extended over a wooden block 21 which is thick enough to support the tails 14—14 horizontally at the median plane of the pack (for beer cans, the block is approximately 2⅝ inches thick). The packaged cans are covered with a heat shield 22 and then a block 23 of insulating material which may be wood, having the cross-sectional shape of a finger or hand hold is pressed against the tails in a central position. Thereafter hot air from the heat gun is directed at the exposed area of the tails.

Figure 6:
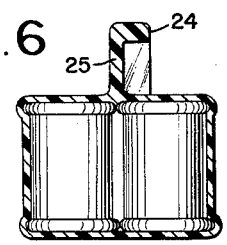
FIGURE 6 is a cross-section through the multi-pack on the line A—A of FIGURE 1, particularly showing the configuration of the handle.

It is characteristic of the films here involved that, when they are rapidly shrunk, the free portion of the film curls over and around each object that restrains its motion. Consequently, when the free ends or tails 14—14 are heated, the two tails fuse together, shrink and draw up around the handhold block 23. The shrunk material crawls up around the block and forms a strong reinforced ring 24 having a thin depressed central diaphragm 25, as shown in FIGURE 6. This is an adequate holding device but, if desired, the diaphragm may be merely slit to provide a through passage for the fingers, or, it may be punched out entirely. Since, during the operation of forming the handle, there is relative motion between the package of cans and the blocks 23 and 21—due to the shrinkage—the operation should be conducted preferably on a smooth or roller surface table to permit the package of cans to approach block 21 without restraint.

I have used, successfully, as the base material of the film, Alathon 14, having an average molecular weight of 20,000, a density of 0.914 and a melt index of 1.8—which has been irradiated to an extent of about 12 megarads and then has been stretched biaxially 350% in both lateral and longitudinal directions—the finished thickness of the film was 1½ mils. This material possesses the shrink energy of about 150 p.s.i. in both directions at 96° C. The irradiation may be accomplished in a conventional manner, e.g., by the use of electron beam generators such as the 2,000,000 volt, General Electric Resonant Transformer Unit or, a Van de Graaf Electron Accelerator operating at approximately 2,000,000 volts with a power output of 500 watts. Other radiation sources, such as Cobalt 60, may be employed provided equivalent total dosage is given. Biaxial orientation may be accomplished by forcing air into a heated tube of polyethylene to form a bubble which is then trapped between two sets of pinch rolls. As the air enters, the tube of polyethylene undergoes both radial and longitudinal stretching to accommodate the air bubble. Trapped between the pinch rolls, the bubble "rides" through the whole length of the extrusion, stretching the polyethylene both laterally and longitudinally and, simultaneously, thinning the extrusion to film thickness.

Instead of the heat gun, any controllable source of heat may be employed, for instance, the packaged cans may be dipped in water that is heated to about boiling temperature. But the gun is preferred for its flexibility and convenience. If hot air is used, its temperature may range from 300° to 750° F. Guns delivering such air temperatures are commercially available.

One of the startling advantages of this invention is that no labeling is required. The package is glass-clear transparent. Thus, it is merely necessary to arrange the cans with their lithograhed labels facing outwardly. The package exhibits each can label as if the container were nonexistent. Accordingly, the cost of printing a carrier is eliminated. The carrier may be supplied to the brewery or to the bottling works as the heat-sealed jacket shown in FIGURE 2. This has the advantage that the jackets may be shipped flat and thousands of such jackets occupy very little space in the user's plant. The carrier is strong, spillproof and completely water impervious. The entire carrier may be refrigerated or soaked in ice water without any loss in strength.

I claim:

The method of producing a multi-pack carrier which includes providing a strip of thin, flexible, heat-shrinkable plastic material having a width greater than that of the packages intended to be enclosed, folding the strip upon itself so that its ends approximately coincide, forming a continuous, transverse heat seal at a point which will form a loop of a size sufficiently loose to encircle the packages while leaving substantial free end portions of the strip extending beyond the transverse seal, inserting a plurality of packages within the loop, heating said lop to shrink the plastic tightly about the packages while insulating the free ends of the strip from said heat to prevent shrinkage thereof, thereafter permitting relative motion of the loop portion and applying heat to said free ends while insulating the central portion of said free ends, said heat being sufficient to merge the exposed areas into a thickened margin thus forming a hand hold.

References Cited by the Examiner
UNITED STATES PATENTS 2,491,422   12/49   Snyder _____ 53—33 X
3,111,221   11/63   Chapman et al.

FRANK E. BAILEY, *Primary Examiner.*

BERNARD STICKNEY, *Examiner.*